United States Patent
Miyashita et al.

(10) Patent No.: US 6,804,179 B2
(45) Date of Patent: Oct. 12, 2004

(54) INFORMATION REPRODUCING APPARATUS CAPABLE OF PERFORMING QUICK ACCESS PLAYBACK

(75) Inventors: Masahiko Miyashita, Saitama-ken (JP); Koji Ogura, Saitama-ken (JP); Harui Koizumi, Saitama-ken (JP); Hiroyasu Eguchi, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 187 days.

(21) Appl. No.: 10/267,835

(22) Filed: Oct. 10, 2002

(65) Prior Publication Data

US 2003/0072223 A1 Apr. 17, 2003

(30) Foreign Application Priority Data

Oct. 15, 2001 (JP) ......................................... 2001-316552

(51) Int. Cl.[7] .............................................. G11B 21/08
(52) U.S. Cl. .................................. 369/30.23; 369/47.34
(58) Field of Search ........................... 369/30.23, 47.32, 369/47.33, 47.34, 30.18, 30.03; 711/3, 4, 102, 103, 104, 105, 111

(56) References Cited

U.S. PATENT DOCUMENTS

| 5,343,452 A | * | 8/1994 | Maeda et al. ............ 369/30.25 |
| 5,502,703 A | * | 3/1996 | Yamada et al. .......... 369/30.23 |
| 5,748,585 A | * | 5/1998 | Tsukamoto et al. ...... 369/30.23 |
| 6,219,311 B1 | * | 4/2001 | Mitsuno .................. 369/30.23 |
| 6,219,321 B1 | * | 4/2001 | Serizawa et al. ........ 369/47.33 |
| 6,249,492 B1 | * | 6/2001 | Mattes .................... 369/30.23 |
| 6,292,454 B1 | * | 9/2001 | Hu .......................... 369/47.32 |
| 6,434,100 B1 | * | 8/2002 | Usui ....................... 369/47.32 |
| 6,590,840 B2 | * | 7/2003 | Inoue et al. ............. 369/30.23 |
| 2003/0076751 A1 | * | 4/2003 | Miyashita et al. ....... 369/30.11 |

* cited by examiner

*Primary Examiner*—Tan Dinh
(74) *Attorney, Agent, or Firm*—Arent Fox

(57) ABSTRACT

An information playback apparatus which can perform random access playback, reverse playback, shuttle playback, etc. quickly and seamlessly. A signal processing unit stores audio data read out from a disc into a buffer memory, and performs information processing for audio playback based on the audio data in the buffer memory. Audio data of certain time durations respectively corresponding to a past and a future with respect to the audio data currently being subjected to audio playback is replenished and stored into the buffer memory. When a jog dial is manipulated, reverse playback, shuttle playback, etc. are performed quickly and seamlessly based on the audio data in the buffer memory. Audio data of certain time durations respectively corresponding to a past and a future with respect to a cue point is also stored into a cue point memory, and when a command to start random access playback is given and/or the jog dial is manipulated, quick random access playback and seamless reverse playback, shuttle playback, etc. are performed based on the audio data in the cue point memory.

8 Claims, 10 Drawing Sheets

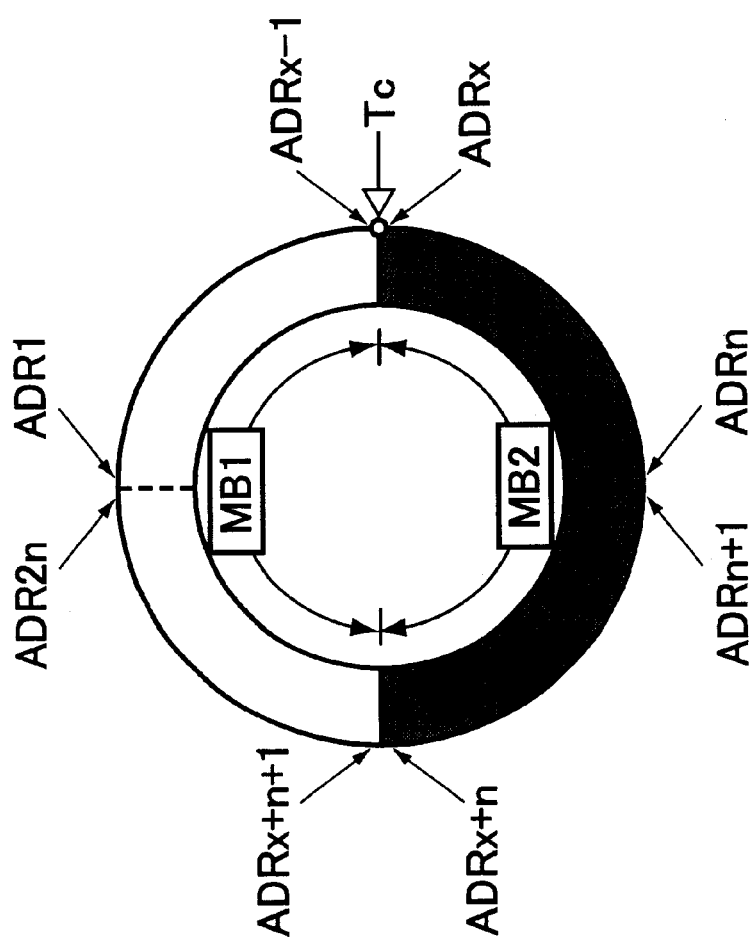
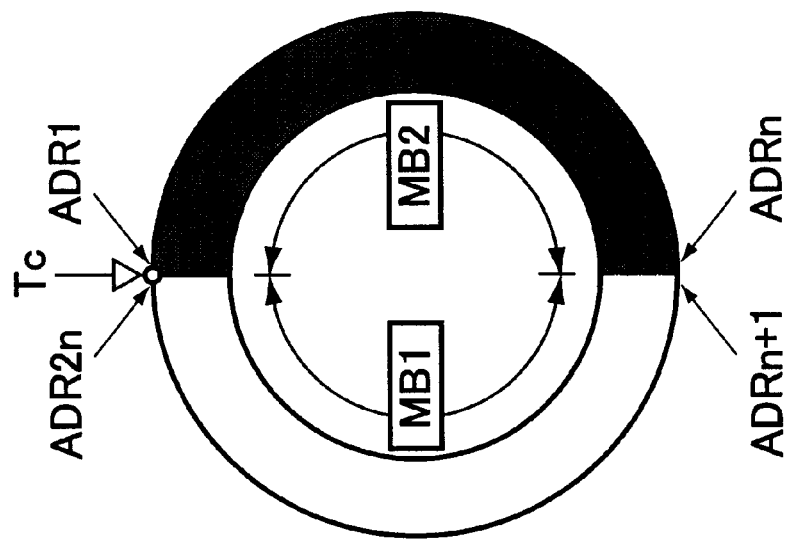
FIG.3 (b)
FIG.3 (a)

BW PLAYBACK DIRECTION ◄---- ⇧ ----► FW PLAYBACK DIRECTION
Tc

→ TIME

→ TIME

FORWARD PLAYBACK

REVERSE PLAYBACK

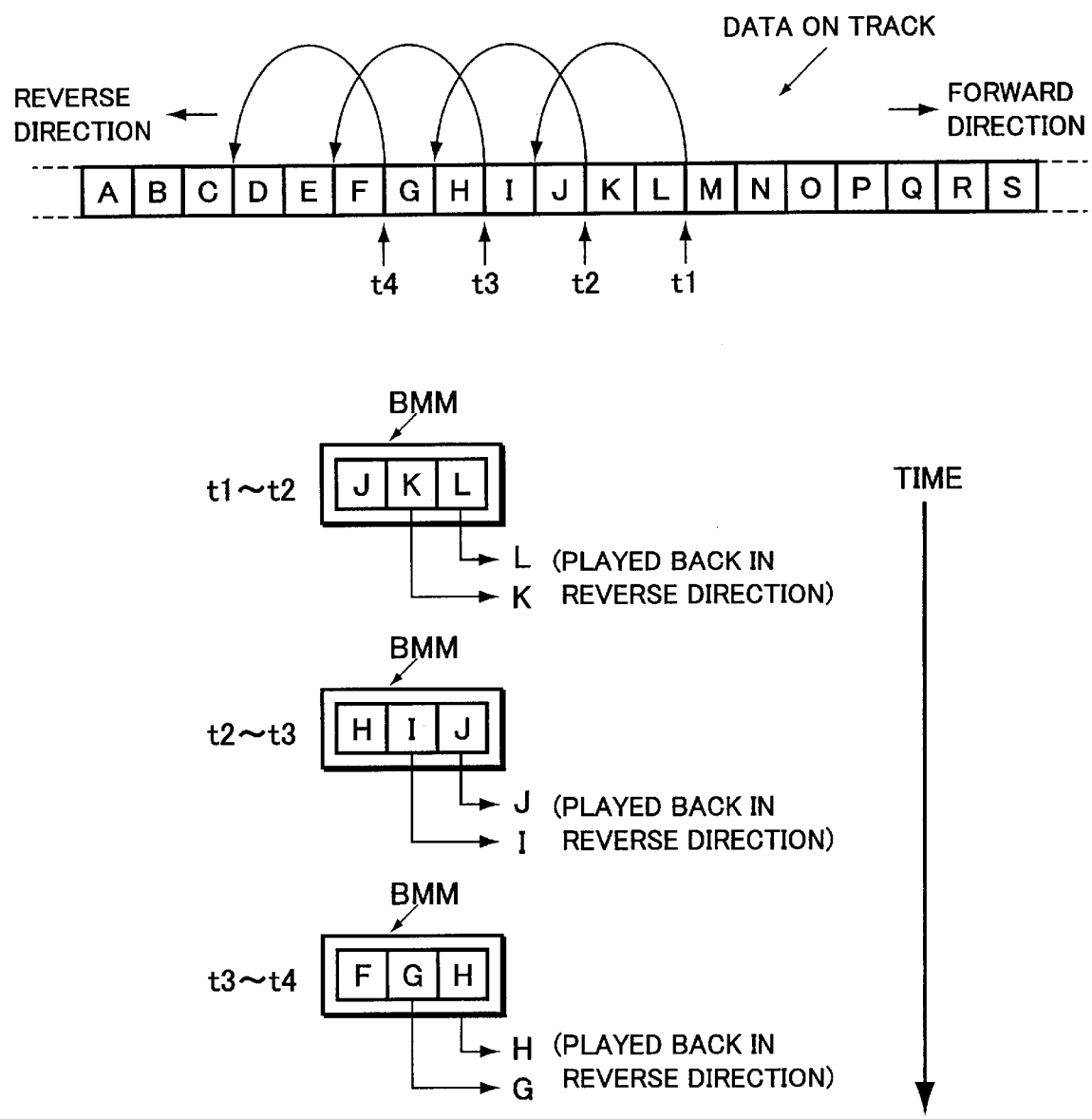

INFORMATION REPRODUCING APPARATUS CAPABLE OF PERFORMING QUICK ACCESS PLAYBACK

BACKGROUND OF THE INVENTION

The present invention relates to an information playback apparatus capable of performing random access playback to start playback from an arbitrary portion, reverse playback, shuttle playback, etc. when playing back information recorded in an information recording medium, such as a CD (Compact Disc), a DVD (Digital Versatile Disc), and an MD (Mini Disc).

The present application claims priority from Japanese Application No. 2001-316552, the disclosure of which is incorporated herein for all purpose.

As a conventional information playback apparatus for playing back information recorded in an information recording medium, such as a CD, a DVD, and an MD, there is known a type furnished with a random access playback function, a reverse playback function, and a shuttle playback function.

The random access playback function is a function to start playing back information from a position called a cue point, and for example, once the user or the like registers the recording position of desired information by the cue point, he/she can readily find the recording position later by automatic search and start information playback therefrom.

The reverse playback function is a function opposite to a forward playback function generally performed for playing back information. Such reverse playback function is used to play back information in a reverse direction, which is otherwise played back in the forward direction with an elapsing of time. For example, the reverse playback function can offer the same advantage attained when an analog record is played by running the stylus on the analog record in a reverse direction by turning the turntable of an analog record player forcedly in the reverse direction.

Hence, as shown in FIG. 8(a) by way of example, when sound information, such as music, recorded in an information recording medium is played back, the waveform of a playback signal S1 generated and supplied to a loudspeaker or the like in the case of forward playback and the waveform of a playback signal S2 generated in the case of reverse playback are inverted in the time base direction.

The shuttle playback function offers the same advantage attained when the forward playback and the reverse playback are performed alternately.

For example, the user or the like can perform shuttle playback as he/she rotates a rotator DL (called a jog dial provided to the information playback apparatus) back and forth as shown in FIG. 8(b).

To be more specific, the jog dial DL is provided with a sensor SEN for detecting rotational direction and speed of the jog dial DL, and when the user or the like manipulates the jog dial DL back and forth in a clockwise direction Fw and in a counterclockwise direction Bw alternately, a detection signal Sn whose polarity is alternatively reversed as shown in FIG. 8(c) is outputted, whereby forward playback and reverse playback are performed alternately in accordance with a change in the detection signal Sn. Hence, when the jog dial DL is manipulated back and forth quickly while information, such as music, recorded in an information recording medium is being played back, it is possible to play imitation sounds (scratching sounds, etc.) different from the original music.

Incidentally, the conventional information playback apparatus is provided with a buffer memory for storing information (data) of a certain time duration to achieve forward playback and reverse playback.

As shown in FIG. 9 which is an example, in the case of forward playback of information (data) A through S recorded on tracks in an information recording medium, data of a certain time duration (data in the forward direction) is read out at a time in advance by the pickup and stored into a buffer memory BMM, so that an original movie or music is played based on the data stored in the buffer memory BMM.

For example, in the case of forward playback of data M, N, O, and so forth, playback from a time point t1 to a time point t2 is performed under a condition in which the data M, N, and O is stored in the buffer memory BMM. Upon completion of this playback, playback from the time point t2 to a time point t3 is started under a condition in which the data O, P, and Q is stored in the buffer memory BMM. Further, upon completion of this playback, playback from the time point t3 to a time point t4 is started under a condition in which the data Q, R, and S is stored in the buffer memory BMM. By repeating the same processing thereafter, seamless forward playback can be accomplished.

In the case of reverse playback, as shown in FIG. 10 which is an example, data of a certain time duration (data in the reverse direction) is read out at a time in advance by the pickup and stored into the buffer memory BMM, so that the data stored in the buffer memory BMM is played back in the reverse order.

It should be noted, however, that, in the case of an information recording medium, such as a CD and a DVD, there is a limit that data on the tracks always has to be read out along the forward direction, which complicates the readout processing in the case of reverse playback in comparison with the case of forward playback.

For example, in the case of reverse playback of data L, K, J and so forth in a sequence in the reverse direction, the pickup is at first moved to the position of the data J, then the data J, K, L is read out and stored into the buffer memory BMM. Subsequently, reverse playback from a time point t1 to a time point t2 is performed by playing back the data K and L in the reverse direction, and further, the pickup is moved to the position of the data H during this reverse playback to start reading the following data H and I as soon as possible.

Then, reverse playback from the time point t2 to a time point t3 is performed by playing back the data I and J out of the data H, I, and J stored in the buffer memory BMM in the reverse direction, and further, the pickup is moved to the position of the data F during this reverse playback to start reading the following data F and G as soon as possible.

Then, reverse playback from the time point t3 to a time point t4 is performed by playing back (in the reverse direction) the data G and H out of the data F, G, and H stored in the buffer memory BMM, and further, the pickup is moved to the position of the data D during this reverse playback to start reading the following data D and E as soon as possible.

Accordingly, seamless reverse playback can be achieved by repeating the foregoing processing.

However, in the case of shuttle playback for performing forward playback and reverse playback alternately, data for forward playback and data for reverse playback need to be updated and stored alternately into the buffer memory BMM at each transition from forward playback to reverse playback or from reverse playback to forward playback. Hence, the pickup has to be moved promptly to a position of particular data. However, in practice, it is difficult to move the pickup promptly to a position of particular data, and therefore, there may be a case that shuttle playback cannot be achieved in association with the rotations of the jog dial. In particular, there is a problem that shuttle playback cannot be achieved when the jog dial is manipulated back and forth too fast.

Also, in the case of the aforementioned random access playback from an arbitrary portion, when access is made to data positioned at a cue point remote from data currently being played back, it takes a long time to move the pickup to the position of the data to be accessed, and for this reason, a desired quick random access playback cannot be achieved.

Particularly, in the case a user or the like may wish to perform shuttle playback immediately after accessing a desired portion, and at this time, a considerably large load will be applied to the pickup, resulting in a situation which not always but often makes it impossible to achieve playback processing in the manner as the user or the like desires.

SUMMARY OF THE INVENTION

The present invention is devised to solve the above conventional problems, and therefore, has an object to provide an information playback apparatus capable of more quickly performing time-consuming playback processing, such as random access playback, reverse playback, and shuttle playback.

In order to achieve the above and other objects, an information playback apparatus of the present invention is an information playback apparatus for playing back information recorded in an information recording medium, including: readout means for reading out the information recorded in the information recording medium; storage means for storing the information read out by the readout means; and information processing means for obtaining the information stored in the storage means and performing information playback processing, wherein: the storage means has a first memory region for storing information of a certain time duration corresponding to a past time and a second memory region for storing information of a certain time duration corresponding to a future time, all with respect to the information obtained by the information processing means; and the readout means reads out the information from the information recording medium to replenish the first memory region and the second memory region with the information.

According to the information playback apparatus of the present invention arranged as above, the readout means reads out information from the information recording medium first, then the storage means stores the information thus read out, and the information processing means performs information playback based on the information stored in the storage means. Herein, the storage means is provided with the first memory region for storing information of a certain time duration corresponding to a past time with respect to the information obtained by the information processing means and the second memory region for storing information of a certain time duration corresponding to a future time with respect to the information obtained by the information processing means, and the readout means replenishes the first and second memory regions with the information of their respective kinds.

Hence, in the case of forward playback, information playback is performed based on the information corresponding to the future time stored in the second memory region in the storage means; in the case of reverse playback, information playback is performed based on the information corresponding to the past time stored in the first memory region in the storage means; and in the case of shuttle playback, information playback is performed based on the information of the respective kinds stored in the first and second memory regions. Further, because the readout means replenishes the first and second memory regions with the information, an unwanted event that information needed for information playback becomes short in the first and second memory regions can be avoided in advance, thereby making it possible to achieve seamless playback, that is, seamless forward playback, reverse playback, and shuttle playback.

The information playback apparatus of the present invention may be arranged in such a manner that it further includes: manipulation means manipulated in a forward direction and in a reverse direction, and that the information processing means obtains the information corresponding to the future time from the second memory region when the manipulation means is manipulated in the forward direction, and obtains the information corresponding to the past time from the first memory region when the manipulation means is manipulated in the reverse direction.

According to the information playback apparatus of the present invention arranged as above, forward playback is performed when the manipulation means is manipulated in the forward direction, reverse playback is performed when the manipulation means is manipulated in the reverse direction, and shuttle playback is performed when the manipulation means is manipulated in the forward direction and in the reverse direction alternately.

The information playback apparatus of the present invention may be arranged in such a manner that the information processing means changes a processing speed of information playback processing for the information obtained from one of the first and second memory regions in response to a manipulation speed when the manipulation means is manipulated in one of the forward direction and the reverse direction.

According to the information playback apparatus of the present invention arranged as above, the processing speed of the information playback processing is changed in response to a manipulation speed of the manipulation means. Consequently, when the manipulation means is manipulated in the forward direction, forward playback is performed depending on the manipulation speed; when the manipulation means is manipulated in the reverse direction, reverse playback is performed depending on the manipulation speed; and when the manipulation means is manipulated in the forward direction and in the reverse direction alternately, shuttle playback depending on a manipulation speed in the forward direction and a manipulation speed in the reverse direction is performed by performing forward playback and reverse playback alternately in response to the manipulation speed in the forward direction and the manipulation speed in the reverse direction, respectively.

Also, an information playback apparatus of the present invention is an information playback apparatus, including: control means for starting playback from arbitrary information recorded in an information recording medium; readout means for reading out information recorded in the information recording medium; first and second storage means for storing the information read out by the readout means; information processing means for obtaining the information stored in one of the first and second storage means and performing information playback processing; and directing means for directing the control means to register the arbitrary information and to start playback from the registered arbitrary information, wherein: the first storage means has a first memory region for storing information of a certain time duration corresponding to a past time and a second memory region for storing information of a certain time duration corresponding to a future time with respect to the information obtained by the information processing means; the second storage means has a first memory region for storing information of a certain time duration corresponding to a past time and a second memory region for storing information of a certain time duration corresponding to a future time with respect to the arbitrary information; once directed by said directing means to register said arbitrary information, said control means controls said readout means to read out the information of the certain time duration corresponding to the past time and the information of the certain time duration corresponding to the future time, which are prior to and subsequent to each other in reference to said arbitrary information, from said information recording medium and store the same into said second storage means, and when directed by said directing means to start the playback from said arbitrary information, said control means controls said information processing means to perform the information playback processing based on the information stored in said second storage means.

According to the information playback apparatus of the present invention arranged as above, it is possible to achieve a so-called random access playback function for accessing arbitrary information recorded in the information recording medium and performing information playback from the accessed information as a starting point.

To be more specific, when directed by the directing means to register arbitrary information, the readout means reads out information prior to and subsequent to each other in reference to the arbitrary information in a time-based relation, that is, information of a certain time duration corresponding to a past time and information of a certain time duration corresponding to a future time, from the information recording medium, and stores the same into the first memory region and the second memory region in the second storage means, respectively. When so-called random access is directed by the directing means later, the information processing means starts random access playback based on the information of the respective kinds stored in the second storage means. By initially starting information playback based on the information stored in the second storage means in this manner in the case of random access playback, it is possible to achieve quick random access playback.

Further, even when so-called random access and reverse playback or shuttle playback are specified substantially at the same time, reverse playback or shuttle playback can be performed based on the information stored in the second storage means, thereby making it possible to achieve quick random access followed by seamless playback.

The information playback apparatus of the present invention may be arranged in such a manner that, while the information processing means is performing the information playback processing based on the information stored in the second storage means, the control means controls the readout means to read out information succeeding the information stored in the second storage means from the information recording medium and store the same into the first storage means, and when storing of the succeeding information into the first storage means is completed, the control means controls the information processing means to switch to the first storage means to obtain the information therefrom.

According to the information playback apparatus of the present invention arranged as above, while the information processing means is performing so-called random access playback based on the information stored in the second storage means, succeeding information is read out from the information recording medium and stored into the first storage means. When storing into the first storage means is completed, information playback processing performed based on the information in the second storage means is switched to information playback processing based on the information stored in the first storage means to continue information playback. Consequently, it is possible to achieve quick random access followed by seamless playback.

The information playback apparatus of the present invention may be arranged in such a manner that the readout means reads out the information from the information recording medium to replenish the first memory region and the second memory region in the first storage means with the information.

According to the information playback apparatus of the present invention arranged as above, in the case of so-called random access playback, the first and second memory regions in the first storage means are replenished with the information after the second storage means is switched to the first storage means. Hence, an unwanted event that information needed for information playback becomes short in the first and second memory regions can be avoided in advance, thereby making it possible to achieve seamless playback.

The information playback apparatus of the present invention may be arranged in such a manner that it further includes manipulation means manipulated in a forward direction and in a reverse direction, and that the information processing means obtains the information corresponding to the future time from one of the second memory region in the first storage means and the second memory region in the second storage means when the manipulation means is manipulated in the forward direction, and obtains the information corresponding to the past time from one of the first memory region in the first storage means and the first memory region in the second storage means when the manipulation means is manipulated in the reverse direction.

According to the information playback apparatus of the present invention arranged as above, forward playback is performed when the manipulation means is manipulated in the forward direction, reverse playback is performed when the manipulation means is manipulated in the reverse direction, and shuttle playback is performed when the manipulation means is manipulated in the forward direction and in the reverse direction alternately. Also, when the manipulation means is manipulated while so-called random access playback is being performed based on the information stored in the second storage means, forward playback, reverse playback, or shuttle playback is performed based on the information stored in the second storage means, and after the information is stored fully into the first storage means during the foregoing playback processing, forward playback, reverse playback, or shuttle playback is continued based on the information stored in the first storage means. Hence, it is possible to achieve quick random access followed by seamless forward playback, reverse playback, or shuttle playback.

The information playback apparatus of the present invention may be arranged in such a manner that the information processing means changes a processing speed of the information playback processing for the information obtained from the first or second memory regions in the first or second storage means in response to a manipulation speed when the manipulation means is manipulated in the forward direction or the reverse direction. According to the information playback apparatus of the present invention arranged as above, forward playback, reverse playback, or shuttle playback is performed depending on a manipulation speed of the manipulation means in the forward direction or in the reverse direction. Also, forward playback, reverse playback, or shuttle playback is performed depending on a manipulation speed of the manipulation means in the forward direction or in the reverse direction, irrespective of whether so-called random access playback is being performed based on the information stored in the second storage means or information playback is being performed based on the information stored in the first storage means.

BRIEF DESCRIPTION OF THE DRAWINGS

These and other objects and advantages of the present invention will become clear from the following description with reference to the accompanying drawings, wherein:

FIGS. 3(a) and 3(b) are views explaining an arrangement and a function of buffer memory;

FIG. 10 is a view explaining a conventional reverse playback function.

DETAILED DESCRIPTION OF THE PREFERRED EMBODIMENTS

The following description will describe one embodiment of the present invention with reference to the drawings. Herein, as a preferred embodiment, an explanation will be given to an information playback apparatus called "an effector" provided with a so-called editing function for playing an information recording medium (hereinafter, referred to simply as a disc), such as a CD and a DVD, and producing sound effects by applying signal processing of various kinds to a playback signal.

Figure 1:
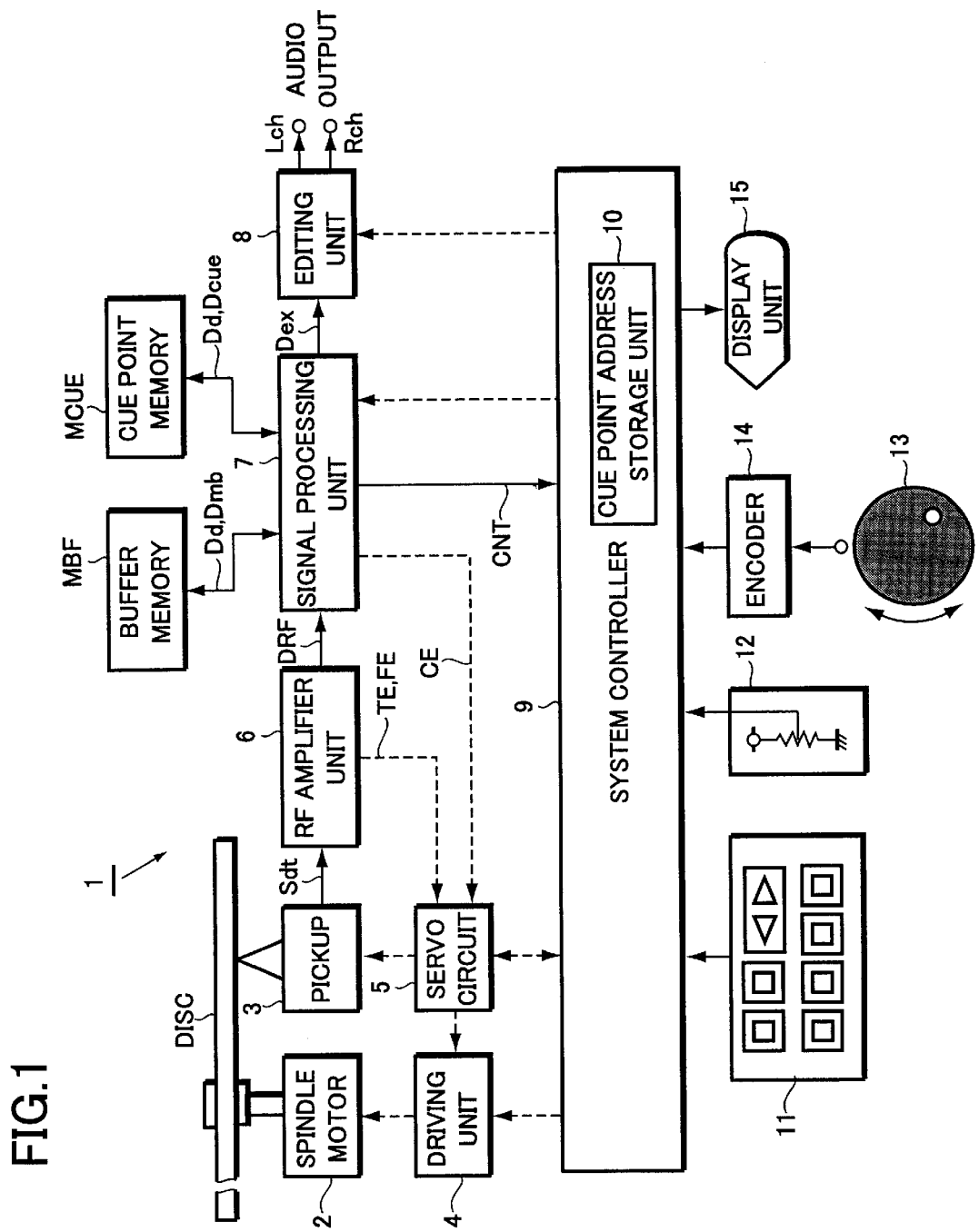
FIG. 1 is a block diagram showing an arrangement of an information playback apparatus according to one embodiment of the present invention.

FIG. 1 is a block diagram depicting an arrangement of an information playback apparatus 1, which is provided with: a spindle motor 2 for rotating a disc DISC at a certain linear velocity; a pickup 3 serving as readout means for optically reading out information recorded in a recording surface of the disc DISC and outputting a readout signal Sdt; a driving unit 4 for driving the spindle motor 2; a servo circuit 5 for applying servo control to the driving unit 4 and the pickup 3; and an RF amplifier unit 6 for generating playback data (RF data) DRF and various error signals including error signals TE and FE, etc. from the readout signal Sdt.

Further, the information playback apparatus 1 is provided with: a signal processing unit 7 serving as information processing means; an editing unit 8; a buffer memory MBF serving as first storage means; a cue point memory MCUE serving as second storage means; a system controller 9 having a cue point address storage unit 10; an input unit 11; a playback speed adjusting unit 12; a jog dial 13 serving as manipulation means; an encoder 14 for detecting a rotational direction and a rotational speed of the jog dial 13; and a display unit 15 for presenting an on-screen menu or the like to the user or the like.

The RF amplifier unit 6 generates the aforementioned RF data DRF from the readout signal Sdt and supplies the same to the signal processing unit 7, and also supplies the error signal TE indicating a tracking error, the error signal FE indicating a focus error, etc. to the servo circuit 5.

Upon receiving the error signal TE, FE or the like, the servo circuit 5 applies the servo control to the pickup 3 with respect to the disc DISC to reduce the occurrence of a tracking error, a focus error, etc. Also, the servo circuit 5 detects a synchronization error in accordance with a synchronization signal CE generated in the signal processing unit 7, and controls the rotations of the spindle motor 2 via the driving unit 4 to reduce the occurrence of the synchronization error.

Although it is not shown in the drawing, a carriage unit for allowing the pickup 3 to move back and forth along the radius of the disc DISC is provided, and so-called random access is achieved by adjusting the position of the pickup 3 with respect to the disc DISC at a command from the system controller 9 described in the following paragraph.

The system controller 9 is composed of a microprocessor (MPU) or the like furnished with computing and controlling functions, and is responsible for the central control on an operation of the entire information playback apparatus 1. Also, the cue point address storage unit 10 is composed of a semiconductor memory unit incorporated in the microprocessor (MPU). Hence, when the user or the like pre-sets a desired cue point, the address in the disc DISC corresponding to this particular cue point is stored therein as cue point address data.

The input unit 11 is provided with a plurality of function keys, that is, various function keys necessary for a playback manipulation, such as an editing key manipulated when appending various sound effects, a play button key for specifying the contents of a playback manipulation, a pause key, and a play/stop key in addition to a cue point register key for setting the aforementioned cue point and a cue point specifying key for specifying the pre-set cue point as an accessed position in random access.

The playback speed adjusting unit 12 is composed of a variable resistor, and is provided to adjust a playback speed when performing audio playback. To be more specific, when the position of an adjustment knob of the variable resistor is deviated from the predetermined reference position, the system controller 9 detects a resistance value which varies with such deviation and directs the signal processing unit 7 and the editing unit 8 to change the playback speed. Consequently, it is possible to play sound effects in tones different from music or the like that is originally played back, depending on a slow playback speed or a fast playback speed in response to the resistance value.

The jog dial 13 is a disc-like rotator allowed to rotate in a clockwise direction as a forward direction and in a counterclockwise direction as a reverse direction, and the encoder 14 detects a rotational speed and a rotational direction of the jog dial 13 and supplies the detection result to the system controller 9. Then, the system controller 9 controls the signal processing unit 7 and the editing unit 8 to perform playback processing in response to the rotational direction and the rotational speed of the jog dial 13 while controlling the operations of the spindle motor 2 and the pickup 3.

When the jog dial 13 is at rest, forward playback is performed at a normal playback speed, and when the jog dial 13 is rotated in the clockwise direction, forward playback is performed at a speed depending on the rotational speed thereof. Also, when the jog dial 13 is rotated in the counterclockwise direction, reverse playback is performed at a speed depending on the rotational speed thereof. Further, when the jog dial 13 is rotated in the clockwise direction and in the counterclockwise direction alternately, forward playback and reverse playback are performed at speeds depending on the rotational speeds thereof in the respective directions.

Although it will be described in more detail below, the playback speed referred to herein is equivalent to a readout address switching speed when successively switching readout addresses by memory access to the buffer memory MBF or the cue point memory MCUE when reading out the audio data stored in the buffer memory MBF or the cue point memory MCUE and performing audio playback based on the readout audio data.

Hence, when the aforementioned playback speed adjusting unit 12 or jog dial 13 is manipulated, the readout address switching speed with respect to the buffer memory MBF or the cue point memory MCUE varies, and by performing audio playback based on the audio data read out from the buffer memory MBF or the cue point memory MCUE in response to a change in the switching speed, it is possible to play sound effects with a tempo different from the tempo of original music from a loudspeaker or the like.

As has been described, the playback speed means a processing speed to change the tempo of a sound which is played from a loudspeaker or the like in the end. To be more specific, the playback speed changes the tempo of a sound by changing the readout address switching speed (that is, the processing speed) when successively switching readout addresses by memory access to the buffer memory MBF or the cue point memory MCUE.

The display unit 15 is composed of a display element, such as a liquid crystal display, and displays on-screen menus for presenting a manipulation method, etc. to the user or the like as described above and an operation status of the information playback apparatus 1.

The signal processing unit 7 is composed of a digital signal processor (DSP) furnished with a computing function, and generates demodulation data (symbol is omitted) by decoding the RF data DRF with a method in conformity with the respective standards of CDs and DVDs. Further, the signal processing unit 7 separates and extracts audio playback data and control data CNT for seamless playback from the demodulation data, and decodes the audio playback data into audio data Dd which makes seamless playback possible, in accordance with the control contents in the control data CNT for seamless playback.

In other words, the control data CNT is the control data to achieve seamless playback of the address data, synchronization data, program chain information (PGCI), etc. pre-recorded in the disc DISC, and in accordance with the control data CNT, the signal processing unit 7 decodes the audio playback data contained randomly in the RF data DRF into a stream of the continuous audio data Dd which makes seamless playback possible.

Figure 2:
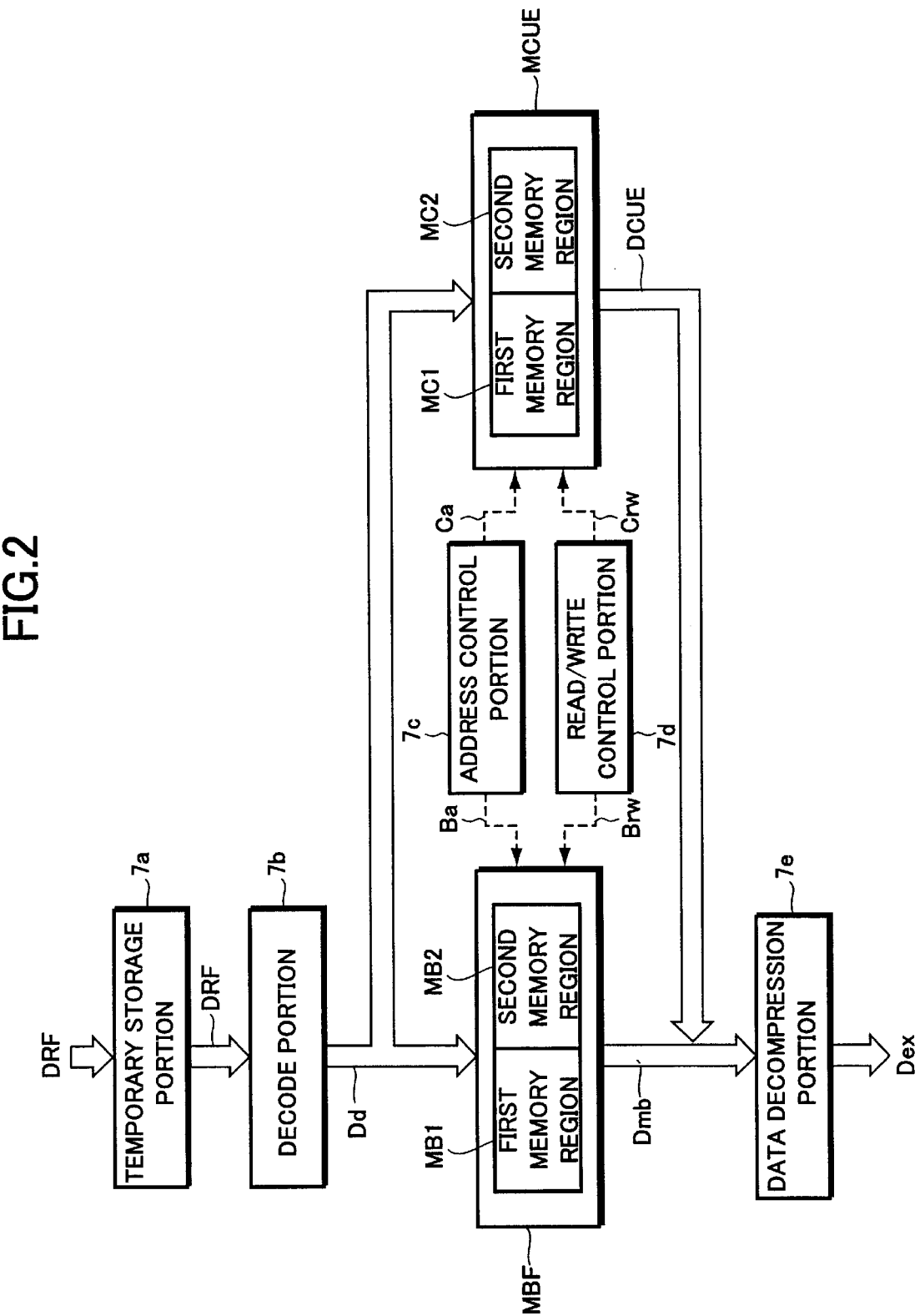
FIG. 2 is a block diagram showing an arrangement of a signal processing unit.

FIG. 2 is a view depicting an arrangement of the signal processing unit 7, and shows a so-called object-oriented arrangement.

The signal processing unit 7 includes a decode portion 7b for performing the aforementioned decode processing, an address control portion 7c, a read/write control portion 7d, and a data decompression portion 7e, and a temporary storage portion 7a (not shown in FIG. 1) composed of a semiconductor memory, the buffer memory MBF, and the cue point memory MCUE are connected to the signal processing unit 7.

The temporary storage portion 7a stores the RF data DRF from the RF amplifier unit 6 temporarily, and is provided as a work area when the decode portion 7b generates the audio data Dd for seamless playback by decoding the RF data DRF.

The buffer memory MBF is composed of a ring memory having a predetermined memory capacity, and it stores the audio data Dd decoded by the decode portion 7b and outputs the audio data Dd thus stored as audio data Dmb under the control of the address control portion 7c and the read/write control portion 7d. The buffer memory MBF chiefly stores the audio data Dd to be played back by forward playback, reverse playback, and shuttle playback, and outputs the stored data Dd as the audio data Dmb.

The cue point memory MCUE is composed of a semiconductor memory having a predetermined memory capacity, and it stores the audio data Dd decoded by the decode portion 7b and outputs the audio data Dd thus stored as the audio data Dcue under the control of the address control portion 7c and the read/write control portion 7d.

It should be noted, however, that the cue point memory MCUE is different from the buffer memory MBF in that, when the user or the like pre-sets a cue point for random access, the cue point memory MCUE stores a certain volume of audio data Dd positioned prior to and subsequent to each other having the cue point in between, so that when the user or the like specifies random access later, it outputs the audio data Dd stored therein as the audio data Dcue related to the cue point.

Having generated the aforementioned audio data Dd, the decode portion 7b supplies the same to the buffer memory MBF or the cue point memory MCUE to be stored therein at a command from the system controller 9. To be more specific, in the case of forward playback, reverse playback, and shuttle playback, the decode portion 7b generates the audio data Dd from the information read out from the disc DISC by the pickup 3, and stores the same into the buffer memory MBF. On the other hand, when the user or the like sets a cue point, the decode portion 7b generates the audio data Dd from the information read out from the disc DISC by the pickup 3 at positions prior to and subsequent to each other with a position of the cue point in between, and stores the same into the cue point memory MCUE.

The address control portion 7c generates address data Ba specifying addresses in the buffer memory MBF and address data Ca specifying addresses in the cue point memory MCUE at a command from the system controller 9.

By supplying read/write control signals Brw and Crw to the buffer memory MBF and the cue point memory MCUE, respectively, at a command from the system controller 9, the read/write control portion 7d controls data writing and data readout operations with respect to the buffer memory MBF and data writing and data readout operations with respect to the cue point memory MCUE.

To be more specific, when the address control portion 7c specifies an address in the buffer memory MBF and the read/write control portion 7d performs the writing control, the audio data Dd is stored at the specified address. On the other hand, when the address control portion 7c specifies an address in the buffer memory MBF and the read/write control portion 7d performs the readout control, the audio data Dd stored at the specified address is outputted as the audio data Dmb.

Also, when the address control portion 7c specifies an address in the cue point memory MCUE and the read/write control portion 7d performs the writing control, the audio data Dd is stored at the specified address. On the other hand, when the address control portion 7c specifies an address in the cue point memory MCUE and the read/write control portion 7d performs the readout control, the audio data Dd stored at the specified address is outputted as the audio data Dcue related to the cue point.

Further, access timing of the address control portion 7c and the read/write control portion 7d to the buffer memory MBF or the cue point memory MCUE when reading out audio data varies in response to the rotational speed of the jog dial 13, and the aforementioned processing speed changes in response to a change in the access timing.

To be more specific, when the user or the like specifies forward playback via the input unit 11 while the jog dial 13 is at rest, the signal processing unit 7 performs audio playback processing by reading out the audio data Dmb or Dcue from the buffer memory MBF or the cue point memory MCUE at the access timing corresponding to a normal playback speed. Hence, ordinary audio playback is performed at a normal processing speed.

On the other hand, when the jog dial 13 is manipulated to rotate in a clockwise direction or in a counterclockwise direction, the processing unit 7 performs audio playback processing by reading out the audio data Dmb or Dcue from the buffer memory MBF or the cue point memory MCUE at the access timing corresponding to rotational speeds in the respective directions. Hence, when the jog dial 13 is manipulated to rotate in a clockwise direction or in a counterclockwise direction, the playback speed varies in response to a change in the access timing. For example, when the jog dial 13 is manipulated while music or the like is being played, a sound is played at a pitch different from the pitch of a normal playback sound.

Each of the address control portion 7c and the read/write control portion 7d controls the buffer memory MBF and the cue point memory MCUE separately, whereby simultaneous writing of the audio data Dd from the decode portion 7b and simultaneous readout of the audio data Dmb and Dcue are inhibited.

Also, the address control portion 7c and the read/write control portion 7d perform so-called writing processing to store the audio data Dd into the buffer memory MBF and the cue point memory MCUE having their respective predetermined memory capacities, and so-called readout processing for reading out the audio data Dmb and Dcue respectively from the buffer memory MBF and the cue point memory MCUE independently from each other. Hence, processing by the pickup 3 for reading out information from the disc DISC and processing within the signal processing unit 7 for audio playback do not interfere with each other.

When the audio data Dmb or Dcue is read out from the buffer memory MBF or the cue point memory MCUE, the data decompression portion 7e applies data decompression to the audio data Dmb or Dcue having undergone data compression by an adequate data compression technique, and supplies the editing unit 8 shown in FIG. 1 with audio data Dex obtained as a result of data decompression. In case that neither the audio data Dmb nor Dcue has undergone data compression, for example, in the case of data of the linear PCM method, the data decompression portion 7e supplies the editing unit 8 with the audio data Dmb or Dcue intact as the audio data Dex without applying any data decompression processing.

Next, the following description will describe arrangements and functions of the buffer memory MBF and the cue point memory MCUE.

Firstly, an explanation will be given to the arrangement and function of the buffer memory MBF.

The buffer memory MBF is composed of a ring memory in which an address ADR1 in the lowest order and an address ADR2n in the highest order are connected, and it is divided into two memory regions MB1 and MB2 each having a nearly equal memory capacity for storing up to n audio data under the address control by the address control portion 7c.

It should be noted, however, that the addresses ADR1 through ADR2n set in the buffer memory MBF are the absolute addresses assigned to physical locations, whereas a region of each of the memory regions MB1 and MB2 varies with reference to a time point Tc at which audio playback is actually being performed.

In other words, for example, as schematically shown in FIG. 3(a), when the audio data Dmb is read out from the address ADR2n and audio playback is actually performed based on the audio data Dmb thus read out, a time point (hereinafter, referred to as the current playback time point) at which the audio playback is actually being performed corresponds to the aforementioned time point Tc.

Since the current playback time point Tc and the address ADR2n are in a one-to-one correspondence, a region from the address ADR1 to the address ADRn and a region from the address ADRn+1 to the address ADR2n prior to and subsequent to each other in reference to the playback time point Tc (to be more specific, in reference to a boundary between the address ADR2n and the address ADR1) are set as the second memory region MB2 and the first memory region MB1, respectively.

Also, in case that a specified address corresponding to the current playback time point Tc is positioned at another address as in FIG. 3(b) showing another embodiment, a region from the address ADRx to the address ADRx+n and a region from the address ADRx+n+1 to the address ADRx−1 prior to and subsequent to each other in reference to the current playback time point Tc are set as the second memory region MB2 and the first memory region MB1, respectively.

As has been described, the first memory region MB1 and the second memory region MB2 vary relatively as a specified address corresponding to the current playback time point Tc moves, and the system controller 9 manages the regions of both the first memory region MB1 and the second memory region MB2 with respect to the current playback time point Tc.

Further, in the case of forward playback, an address specified by the address data Ba moves successively toward the addresses in the higher order. In other words, the current playback time point Tc moves toward the addresses where audio data Dd belonging to a future time (hereinafter, referred to as future audio data) is stored, and the audio data Dd read out from an address corresponding to the current playback time point Tc is outputted as the audio data Dmb.

Further, in the case of reverse playback, an address specified by the address data Ba moves successively toward to the addresses in the lower order. In other words, the current playback time point Tc moves toward the addresses where audio data Dd belonging to a past time (hereinafter, referred to as past audio data) is stored, and the audio data Dd read out from an address corresponding to the current playback time point Tc is outputted as the audio data Dmb.

Hence, the second memory region MB2 is a region into which the future audio data Dd with respect to the current playback time point Tc is stored, whereas the first memory region MB1 is a region into which the past audio data Dd with respect to the current playback time point Tc is stored.

It should be noted that, in the case of forward playback, the audio data Dd in the second memory region MB2 recorded at the addresses in the lower order than the address corresponding to the current playback time point Tc does not stay as the future audio data and turns to the past audio data as the current playback time point Tc moves. Hence, in the case of forward playback, a volume of the past audio data increases whereas a volume of the future audio data decreases as the current playback time point Tc moves.

Accordingly, the system controller 9 checks a difference (Nps–Nft) between a total number Nps of the past audio data and a remaining number Nft of the future audio data from time to time, and when the difference reaches a predetermined value Nthd, it controls the pickup 3 to read out information to replenish the future audio data.

Figure 4:
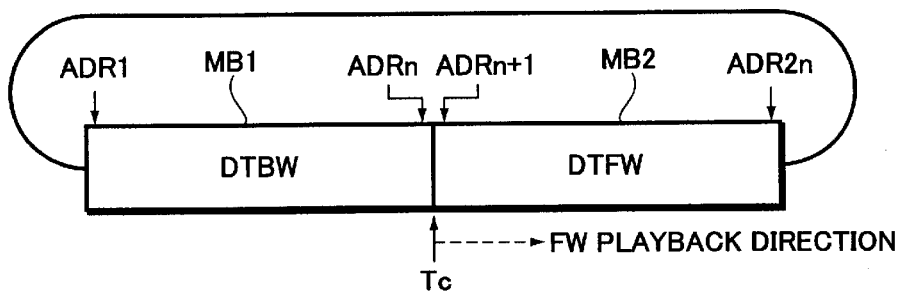
FIGS. 4(a) through 4(c) are views showing an operation example of the buffer memory in the case of forward playback.
Figure 4:
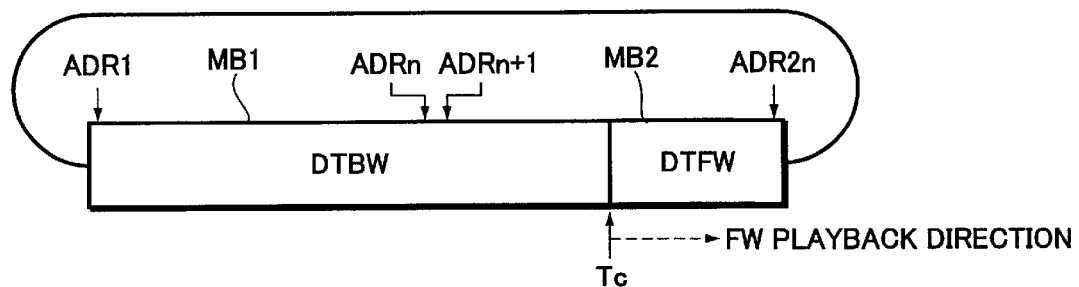
Figure 4:
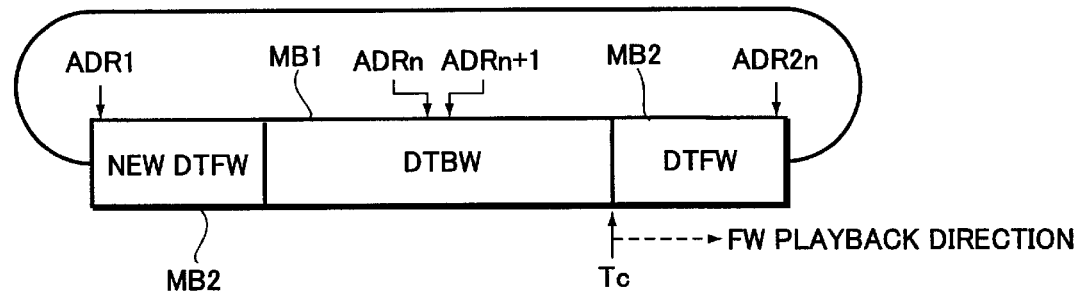

FIGS. 4(a) through 4(c) are views schematically showing an operation for replenishing the future audio data.

As has been described, in the case of forward playback, an address corresponding to the current playback time point Tc moves toward the addresses in the higher order (hereinafter, referred to as the FW playback direction), and processing for replenishing the audio data is started, for example, when a state of FIG. 4(a) changes to a state of FIG. 4(b), in which the remaining number Nft of the future audio data (denoted as DTFW in the drawing) in the second memory region MB2 decreases while the number Nps of the past audio data (denoted as DTBW in the drawing) increases.

In other words, in the case shown in FIG. 4(b) by way of example, the future audio data DTFW is stored in a region from the address corresponding to the current playback time point Tc to the address ADR2n, and the past audio data DTBW is stored in a region from the address ADR1 to the address corresponding to the current playback time point Tc.

Then, when a difference (Nps–Nft) between the audio data DTFW and DTBW reaches the predetermined value Nthd, the pickup 3 starts to read out information to replenish the future audio data, and as shown in FIG. 4(c), new audio data (Nthd data) obtained from the newly readout information is stored into a region (a region denoted as new DTFW in the drawing) from the address ADR1 in the lowest order to the address Nthd orders higher in connection with the playback time.

As a result, of all the past audio data DTBW, the audio data (Nthd data) corresponding to the oldest time is replaced with the newly generated future audio data (Nthd data), whereby the audio data DTBW in the first memory region MB1 and the audio data DTFW in the second memory region MB2 become equal in number. Also, the audio data DTBW is stored in a sequence according the playback order. That is, the audio data DTBW is stored from the addresses in the lower order to the higher order in the first memory region MB1. Likewise, the audio data DTFW is stored in a sequence according to the playback order. That is, the audio data DTFW is stored from the addresses in the lower order to the higher order in the second memory region MB2.

Also, it should be noted that, in the case of reverse playback, the audio data Dd in the first memory region MB1 recorded at the addresses in the higher order than the address corresponding to the current playback time point Tc does not stay as the past audio data and turns to the future audio data as the current playback time point Tc moves. Hence, in the case of reverse playback, a volume of the past audio data decreases whereas a volume of the future audio data increases as the current playback time point Tc moves.

Accordingly, the system controller 9 checks a difference (Nps–Nft) between a total number Nps of the past audio data and a remaining number Nft of the future audio data from time to time, and when the difference reaches a predetermined value –Nthd, it controls the pickup 3 to read out information to replenish the past audio data.

Figure 5:
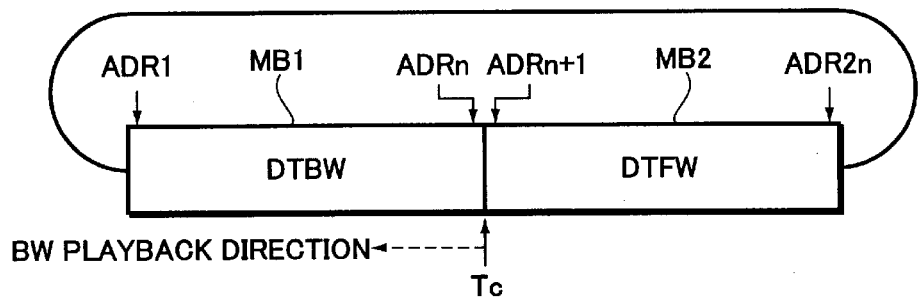
FIGS. 5(a) through 5(c) are views showing an operation example of the buffer memory in the case of reverse playback.
Figure 5:
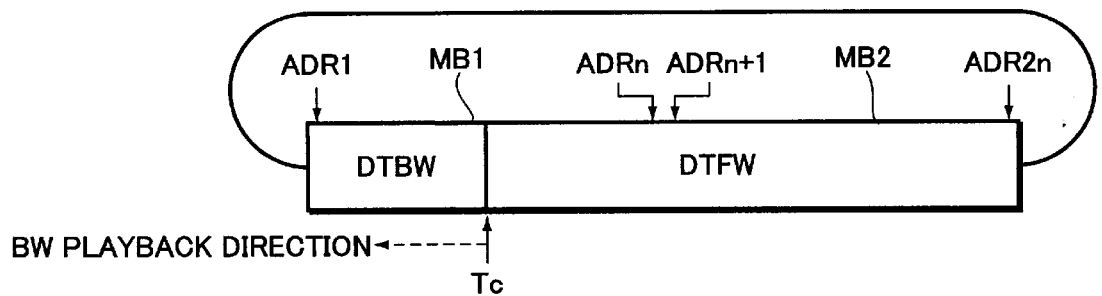
Figure 5:
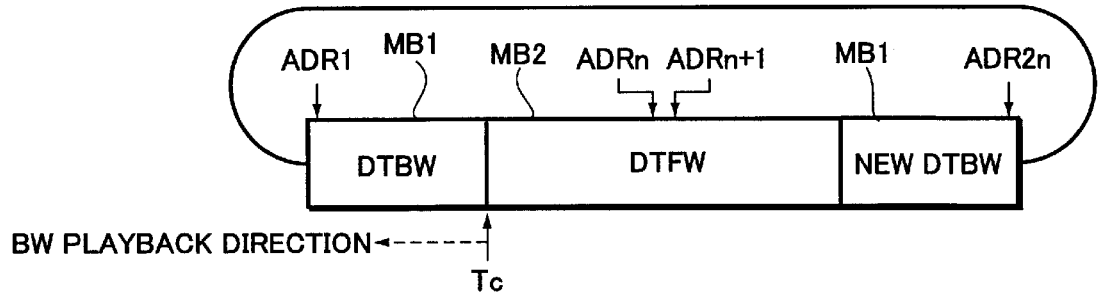

FIGS. 5(a) through 5(c) are views schematically showing an operation for replenishing the past audio data.

As has been described, in the case of reverse playback, an address corresponding to the current playback time point Tc moves toward the addresses in the lower order (hereinafter, referred to as the BW playback direction), and processing for replenishing the audio data is started, for example, when a state of FIG. 5(a) changes to a state of FIG. 5(b), in which the remaining number Nft of the past audio data (denoted as DTBW in the drawing) in the first memory region MB1 decreases while the number Nps of the future audio data (denoted as DTFW in the drawing) increases.

In other words, in the case shown in FIG. 5(b) by way of example, the past audio data DTBW is stored in a region from the address ADR1 to the address corresponding to the current playback time point Tc, and the future audio data DTFW is stored in a region from the address corresponding to the current playback time point Tc to the address ADR2n.

Then, when a difference (Nps–Nft) between the audio data DTFW and DTBW reaches the predetermined value –Nthd, the pickup 3 starts to read out information to replenish the audio data corresponding to a past time, and as shown in FIG. 5(c), new audio data (Nthd data) obtained from the newly readout information is stored into a region (a region denoted as new DTBW in the drawing) from the address ADR2n in the highest order to the address Nthd orders lower in connection with the playback time.

As a result, of all the future audio data DTFW, the audio data (Nthd data) corresponding to the most far future time is replaced with the newly generated past audio data (Nthd data), whereby the audio data DTBW in the first memory region MB1 and the audio data DTFW in the second memory region MB2 become equal in number. Also, the audio data DTBW is stored in a sequence according the playback order. That is, the audio data DTBW is stored from the addresses in the lower order to the higher order in the first memory region MB1. Likewise, the audio data DTFW is stored in a sequence according to the playback order. That is, the audio data DTFW is stored from the addresses in the lower order to the higher order in the second memory region MB2.

In the case of shuttle playback, because forward playback and reverse playback are performed alternately, the processing explained with reference to FIGS. 4(a) through 5(c) is performed in making the past audio data stored in the first memory region MB1 and the future audio data stored in the second memory region MB2 equal in number.

Next, the following description will describe the arrangement and function of the cue point memory MCUE.

Referring to FIG. 2 again, like the buffer memory MBF, the cue point memory MCUE is divided into a first memory region MC1 and a second memory region MC2 each storing up to n audio data prior to and subsequent to each other having a boundary at the position of the cue point. The audio data prior to the position of the cue point is stored into the first memory region MC1 and the audio data subsequent to the position of the cue point is stored into the second memory region MC2.

It should be noted, however, that the cue point memory MCUE is different from the buffer memory MBF in that, because a cue point the user or the like specifies is a fixed location, physical addresses ADR1 through ADRn and physical addresses ADRn+1 through ADR2n of the cue point memory MCUE are fixed in the first memory region MC1 and the second memory region MC2, respectively.

Thus, when the user or the like specifies a cue point he/she has pre-set for random access after the future audio data and the past audio data related to the cue point are stored, the stored future or past audio data is read out as soon as possible and outputted to the data decompression portion 7e.

Further, while the stored future or past audio data is being outputted to the data decompression portion 7e, in order to generate audio data which makes seamless playback possible following the audio data in the cue point memory MCUE, the pickup 3 reads out information at a command from the system controller 9, and the decoded audio data Dd outputted from the decode portion 7b as a result of the information reading is stored into the buffer memory MBF. Then, when the buffer memory MBF has fully stored the audio data Dd, the data readout from the cue point memory MCUE is stopped and switched to the readout of the audio data Dmb from the buffer memory MBF, after which an operation for the aforementioned forward playback, reverse playback, or shuttle playback is started.

In case that the user or the like specifies forward playback, reverse playback, or shuttle playback substantially at the same time he/she specifies the aforementioned cue point for random access, a quick response is made by reading out the audio data Dcue corresponding to the current playback time point Tc from the future or past audio data stored in the cue point memory MCUE first, and when the audio data needed to make the seamless playback possible has been fully stored in the buffer memory MBF, the data readout from the cue point memory MCUE is stopped and switched to the readout of the audio data Dmb from the buffer memory MBF.

Memory capacities of the buffer memory MBF and the cue point memory MCUE, that is, the number n of the storable audio data in each of the first memory regions MB1 and MC1 and the second memory regions MB2 and MC2, are set in such a manner that the audio data Dd in each of the memory regions MB1, MC1, MB2, and MC2 will never be short even when the pickup 3 reads out information from the disc DISC while audio playback is being performed based on the audio data Dmb and Dcue read out from the respective memory regions MB1, MC1, MB2, and MC2. In other words, seamless playback can be always achieved by securing the number n of storable data within a minimum range so that the audio data Dmb and Dcue will not be used up during a time required for the pickup 3 to read out information from the disc DISC to generate the audio data Dd for seamless playback.

The editing unit 8 generates an analog audio signal by digital-to-analog conversion, that is, by converting the audio data Dex supplied from the signal processing unit 7 to an analog audio signal with a digital-to-analog converter (not shown), and further, it applies power amplification and outputs the resulting analog audio signal to sound a loudspeaker. Also, in a case where the audio data Dex of the stereo system is supplied, channels are isolated and an analog audio signal is outputted for each channel.

The digital-to-analog converter converts the audio data Dex into the analog audio signal in sync with a fixed sampling frequency determined based on a so-called sampling theorem. Hence, when the aforementioned playback speed adjusting unit 12 or jog dial 13 is manipulated, the readout address switching speed with respect to the buffer memory MBF or the cue point memory MCUE varies, in response to which the number of the audio data Dex supplied to the digital-to-analog converter per unit time varies. Consequently, the digital-to-analog converter outputs, for example, an analog audio signal which can play sound effects at a tempo different from the tempo of original music.

Further, the editing unit 8 pre-stores modulation data, such as a sawtooth wave, a rectangular wave, a triangular wave, a waveform imitating a sound of a jet plane. Hence, when the user or the like specifies desired modulation data via the input unit 11, the editing unit 8 modulates the audio data Dex with the specified modulation data, and converts the modulated audio data to an analog audio signal, whereby various sound effects can be played.

Figure 6:
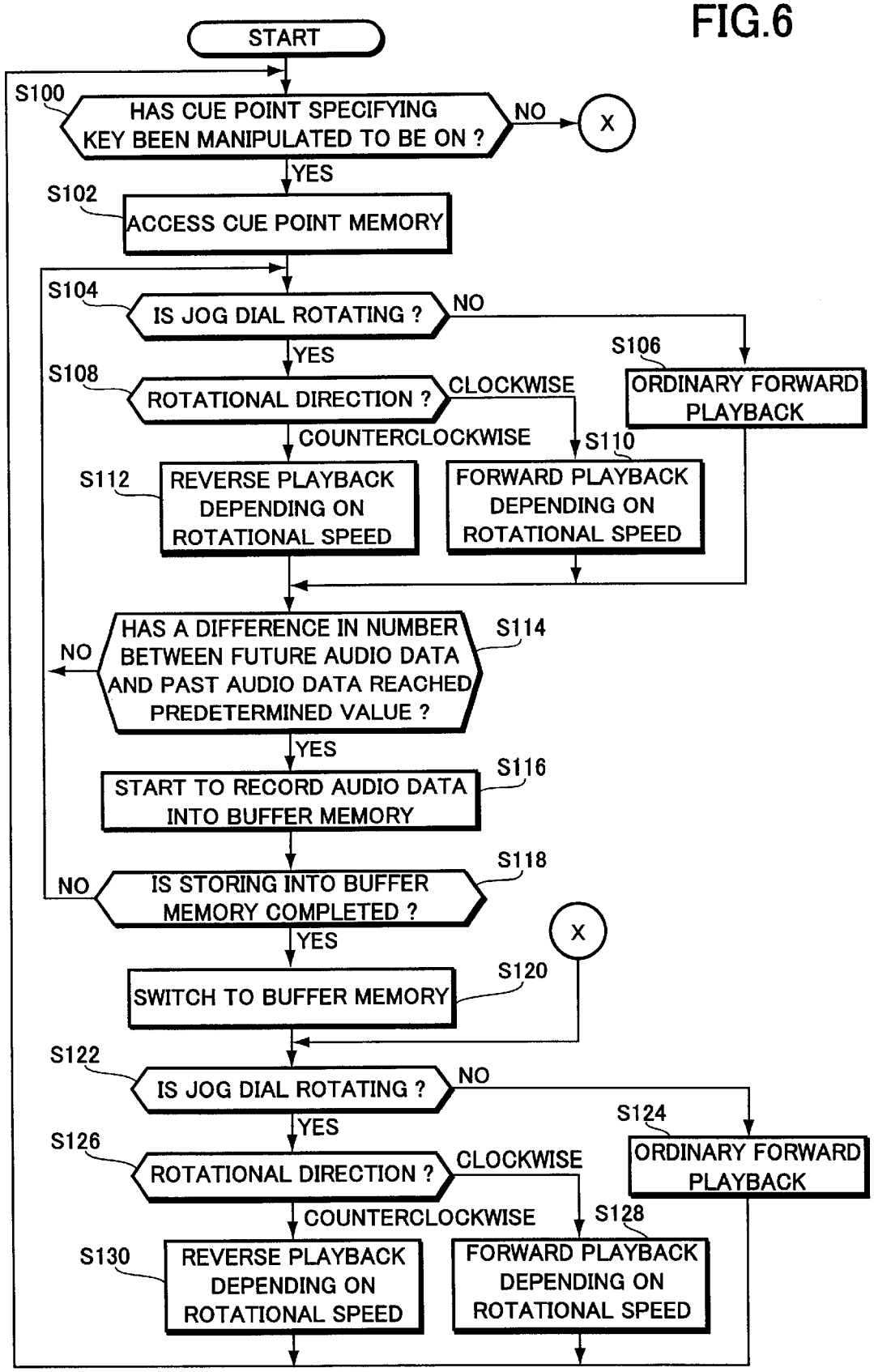
FIG. 6 is a flowchart detailing an operation of the information playback apparatus of the present invention.

Next, the following description will describe an operation of the information playback apparatus 1 arranged as above with reference to a flowchart of FIG. 6. Herein, an explanation will be given to a typical case, where the user or the like specifies a cue point and then manipulates the jog dial 13.

When the user or the like directs to start playback first, the pickup 3 starts to read out information, and processing for audio playback is continued while the audio data Dd obtained from this information reading is being stored into the buffer memory MBF. Subsequently, when the user or the like manipulates the cue point register key to be ON at an arbitrary time point during the audio playback, the system controller 9 detects address data related to the audio data at this particular playback time point from the control data CNT and stores (registers) the detected address data in the cue point address storage unit 10.

Further, the audio data Dd stored in the first and second memory regions MB1 and MB2 in the buffer memory MBF, that is, the audio data Dd positioned prior to and subsequent to each other in reference to the cue point, is transferred from the buffer memory MBF to the cue point memory MCUE to be stored into the first and second memory regions MC1 and MC2, after which the process proceeds to Step S100 of the drawing.

In Step S100, whether the cue point specifying key is manipulated to be ON is judged. When it is manipulated to be ON, the flow proceeds to Step S102; otherwise, the flow skips to Step S122.

Firstly, when the flow skips to Step S122, whether the jog dial 13 is manipulated while the operation of audio playback is continuing is judged. Herein, when the jog dial 13 is not manipulated, that is, when it remains at rest, the flow proceeds to Step S124, in which ordinary forward playback is performed at a normal processing speed, and the processing from Step S100 is repeated.

When the jog dial 13 is manipulated in Step S122, the flow proceeds to Step S126, in which a rotational direction of the jog dial 13 is judged. Herein, when the jog dial 13 is rotated in a clockwise direction, the flow proceeds to Step S128, and when the jog dial is rotated in a counterclockwise direction, the flow proceeds to Step S130.

When the flow proceeds to Step S128, a rotational speed of the jog dial 13 being manipulated to rotate in the clockwise direction is detected, and memory access to the buffer memory MBF is made at access timing depending on the detected rotational speed within a predetermined unit time. Further, forward playback is performed at a processing speed depending on the detected rotational speed based on the audio data Dmb read out by memory access, after which the processing from Step S100 is repeated.

When the flow proceeds to Step S130, a rotational speed of the jog dial 13 being manipulated to rotate in the counterclockwise direction is judged, and memory access to the buffer memory MBF is made at access timing depending on the detected rotational speed within a predetermined unit time. Further, reverse playback is performed at a processing speed depending on the detected rotational speed based on the audio data Dmb read out by memory access, after which the processing from Step S100 is repeated.

Figure 7:
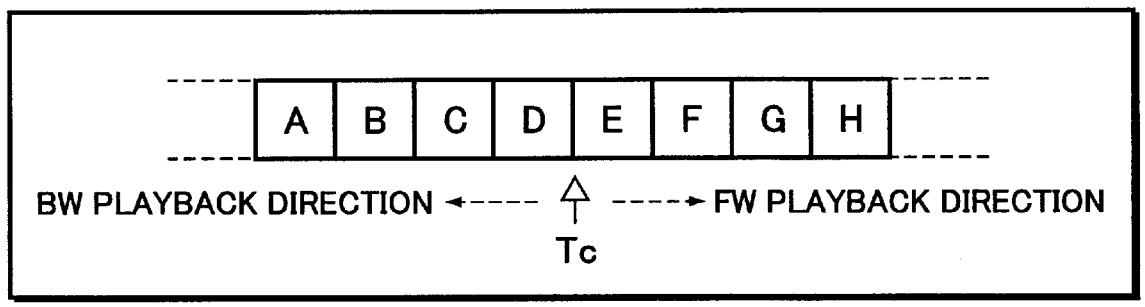
FIGS. 7(a) through 7(c) are views showing an operation example of a cue point memory.
Figure 7:
Figure 7:
Figure 8:
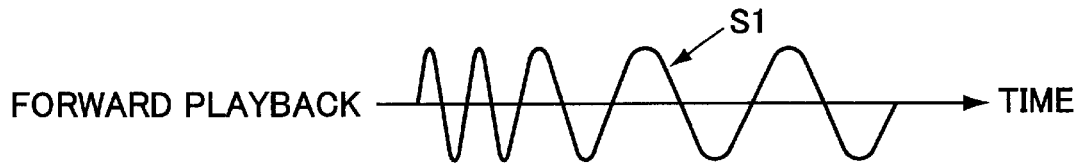
FIGS. 8(a) through 8(c) are views explaining functions for forward playback, revere playback and shuttle playback.
Figure 8:
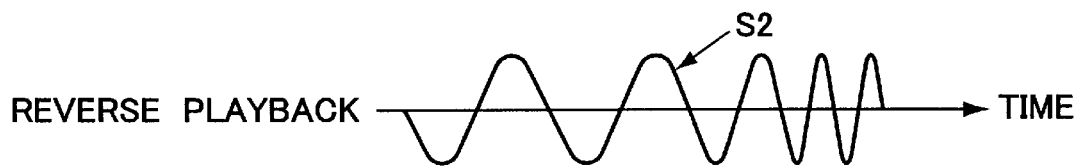
Figure 8:
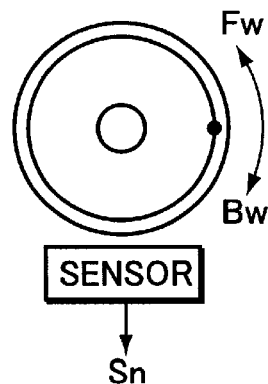
Figure 8:
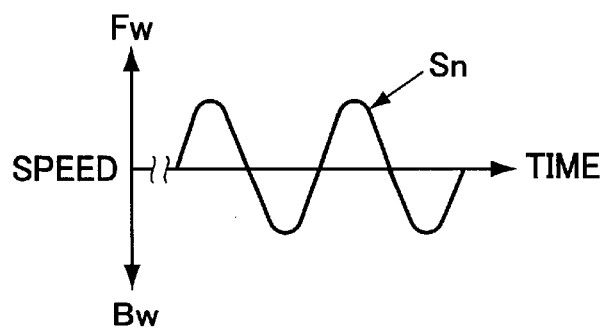
Figure 9:
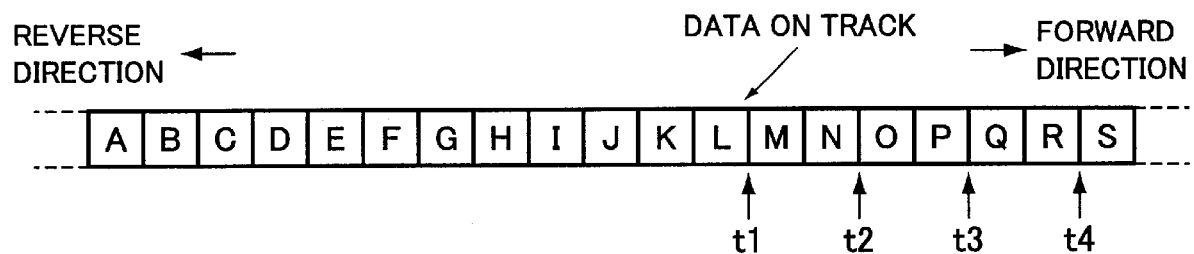
FIG. 9 is a view explaining a conventional forward playback function.
Figure 9:
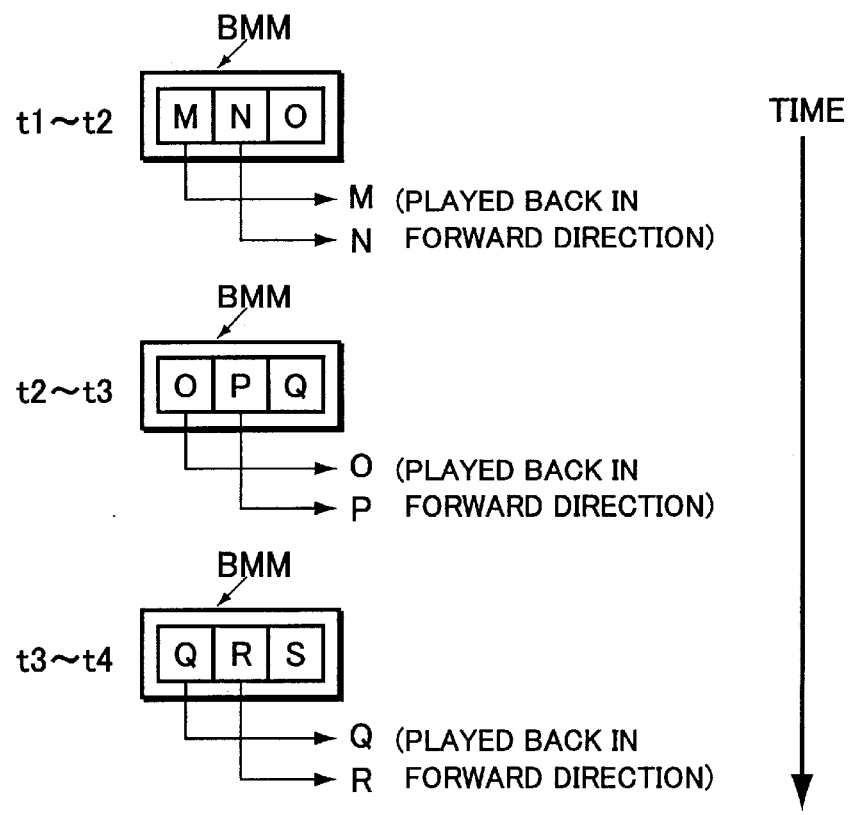

Hence, unless the user or the like manipulates the cue point specifying key to be ON, the processing in Steps S122 through S130 is repeated. As a result, as shown in FIG. 7(a) by way of example, in the case of forward playback, as the specified address corresponding to the current playback time point Tc moves in the FW playback direction, audio playback is performed in the order of the audio data E, F, G, H and so forth as shown in FIG. 7(b) by way of example. On the other hand, in the case of reverse playback, as the specified address corresponding to the current playback time point Tc moves in the BW playback direction, audio playback is performed in the order of the data D, C, B, A, and so forth (reverse direction) as shown in FIG. 7(c) by way of example. Also, in a case where the jog dial 13 is manipulated to rotate back and forth, forward playback and reverse playback are performed alternately as the specified address corresponding to the current playback time point Tc moves in the FW playback direction and in the BW playback direction alternately.

When the jog dial 13 is manipulated to rotate further, the move timing of the specified address corresponding to the current playback time point Tc varies with the rotational speed of the jog dial 13, thereby making it possible to produce various sound effects. For example, when the user or the like manipulates the jog dial 13 back and forth, imitation sounds called scratching sounds, such as "squeaks" and "crinkles," can be played.

Referring to FIG. 6 again, when the user or the like manipulates the aforementioned cue point specifying key to be ON and the flow proceeds to Step S102, memory access is made to the cue point memory MCUE. Herein, random access is performed by specifying an address positioned at the boundary of the first memory region MC1 and the second memory regions MC2 in the cue point memory MCUE based on the address data registered in the cue point address storage unit 10, and further, the specified address is set as an address corresponding to the initial current playback time point Tc.

In other words, in response to the ON-manipulation of the aforementioned cue point register key, the past audio data Dd corresponding to a past time with respect to the cue point and the future audio data Dd corresponding to a future time with respect to the cue point in an equal number n are already stored respectively in the first memory region MC1 and the second memory region MC2. For this reason, when the cue point specifying key is manipulated to be ON, the address corresponding to the initial current playback time point Tc is set substantially at the center of the past audio data Dd and the future audio data Dd.

Then, in Step S104, whether the jog dial 13 is manipulated to rotate is judged, and when it is not manipulated to rotate, the flow proceeds to Step S106, in which ordinary forward playback is performed based on the audio data Dcue in the cue point memory MCUE within a predetermined unit time, and then the flow proceeds to Step S114.

When the jog dial 13 is manipulated to rotate, the flow proceeds from Step S104 to Step S108, in which a rotational direction of the jog dial 13 is judged. Herein, when the jog dial 13 is rotated in the clockwise direction, the flow proceeds to Step S110, and the flow proceeds to Step S112 when the jog dial 13 is rotated in the counterclockwise direction.

When the flow proceeds to Step S110, a rotational speed of the jog dial 13 being manipulated to rotate in the clockwise direction is detected, and memory access is made to the cue point memory MCUE at access timing depending on the detected rotational speed within a predetermined unit time. Then, forward playback is performed at a processing speed depending on the detected rotational speed based on the audio data Dcue read out by memory access, after which the flow proceeds to Step S114.

When the flow proceeds to Step S112, a rotational speed of the jog dial 13 being manipulated to rotate in the counterclockwise direction is detected, and memory access is made to the cue point memory MCUE at access timing depending on the detected rotational speed within a predetermined unit time. Then, reverse playback is performed at a processing speed depending on the detected rotational speed based on the audio data Dcue read out by memory access, after which the flow proceeds to Step S114.

Then, in Step S114, a difference in the number between the future audio data and the past audio data caused by the forward playback or the reverse playback as the specified address corresponding to the current playback time point Tc moves is checked, and whether the difference has reached a pre-set certain number (reference number) is judged. Herein, when the difference in number between the future audio data and the past audio data has not reached the reference value, the processing from Step S104 is repeated; otherwise, the flow proceeds to Step S116.

In other words, when the difference in number between the future audio data and the past audio data is smaller than the reference value, it is judged that the audio data Dcue needed to perform seamless playback is left sufficiently in the cue point memory MCUE. Thus, the flow proceeds to Step S104, so that audio playback is continued based on the audio data Dcue in the cue point memory MCUE.

In Step S116, it is judged that the audio data Dcue needed to perform seamless playback is becoming insufficient, and the processing is started to store new audio data Dd into the buffer memory MBF. In other words, upon the judgment that the audio data Dcue is becoming short, a specific track address in the disc DISC where the audio data Dcue stored at the specified address corresponding to the current playback time point Tc was originally stored is found from the control data CNT. Then, the pickup 3 is moved to the track address thus found, so that it starts to read out information positioned prior to and subsequent to each other in reference to the track address.

Accordingly, new audio data Dd obtained from the information reading by the pickup 3 is stored into the first memory region MB1 and the second memory region MB2 in the buffer memory MBF.

Since the information reading by the pickup 3 is slower than the processing for audio playback by the signal processing unit 7, when the processing in Step S116 is started, the flow proceeds to Step S118 immediately.

In Step S118, whether each of the first memory region MB1 and the second memory region MB2 has stored the audio data Dd to their full is judged, and if not, the flow proceeds to Step S104. In other words, the processing from Step S104 is repeated since the processing in Step S116 is started until each of the first memory region MB1 and the second memory region MB2 will have stored the audio data Dd to their full, so that audio playback is continued based on the audio data Dcue stored in the cue point memory MCUE.

Then, when it is judged that the first memory region MB1 and the second memory region MB2 have stored the audio data Dd to their full in Step S118, the flow proceeds to Step S120, in which audio playback performed based on the audio data Dcue stored in the cue point memory MCUE is stopped and switched to audio playback based on the audio data Dmb stored in the buffer memory MBF.

As has been described, when the cue point is specified in Step S100, audio playback is started as soon as possible based on the audio data Dcue stored in the cue point memory MCUE, thereby making it possible to start so-called random access playback quickly.

Further, even when the jog dial 13 is manipulated to rotate substantially at the same time the cue point is specified, the cue point memory MCUE has stored the past audio data and the future audio data in a sufficient volume not to cause a problem in performing forward playback, reverse playback, and shuttle playback. Consequently, it is possible to perform quick random access and seamless forward playback, reverse playback, and shuttle playback.

In particular, in the case of reverse playback and shuttle playback, because a load is applied to the pickup 3 when it operates to read out information, there is a conventional problem that the response is poor when the jog dial 13 is manipulated substantially at the same time the random access is specified. However, the present embodiment can forestall such a problem.

In other words, as has been described, since the past audio data and the future audio data up to a nearly equal number n having the boundary at the current playback time point Tc corresponding to the cue point are stored in the cue point memory MCUE, even when the jog dial 13 is manipulated, it is still possible to achieve audio playback with excellent trackability.

Further, the pickup 3 reads out information and the new audio data Dd is stored into the buffer memory MBF while the audio playback is performed based on the data in the cue point memory MCUE, and when the audio data has been stored fully in the buffer memory MBF, audio playback is switched and continued based on the audio data in the buffer memory MBF. This arrangement makes it possible to achieve excellent seamless playback.

Then, when audio playback is continued by switching to audio playback based on the audio data in the buffer memory MBF, the aforementioned processing in Steps S122 through S130 is performed.

Although it is not shown in FIG. 6, the judgment about whether the cue point specifying key is manipulated to be ON in Step S100 is made from time to time as so-called interruption processing. When the ON-manipulation of the cue point specifying key is judged by the interruption processing, the processing from Step S102 is forcedly started. This allows the user or the like to perform random access playback at any time in the middle of audio playback by an ON-manipulation of the cue point specifying key. Hence, the user or the like can perform sophisticated editing processing by manipulating the information playback apparatus 1, for example, he/she can produce various sound effects by using the jog dial 13 while music or the like recorded in the disc DISC is played from a desired position by random access playback.

The flowchart of FIG. 6 omits an operation when replenishing the buffer memory MBF with the audio data as described with reference to FIGS. 4(a) through 5(c), and the audio data replenishing processing is performed by so-called interruption processing. To be more specific, as has been described, it is checked from time to time whether a difference (Nps−Nft) in number between the past audio data and the future audio data in the buffer memory MBF caused by audio playback has reached the predetermined value Nthd or −Nthd. Herein, the replenishing processing is started when the difference (Nps−Nft) has reached the predetermined value Nthd or −Nthd by the interruption processing, so that the past audio data and the future audio data become equal in number.

As has been described, according to the information playback apparatus 1 of the present embodiment, the cue point memory MCUE is provided to store the past audio data and the future audio data in the first memory region MC1 and the second memory region MC2, respectively, so that random access playback is started based on the audio data in the cue point memory MCUE. This arrangement offers an excellent advantage that quick random access is made possible. Further, since the past audio data and the future audio data are stored in the first memory region MC and the second memory region MC2, respectively, there can be attained an excellent advantage that even when the jog dial 13 is manipulated, forward playback, reverse playback, and shuttle playback can be performed seamlessly.

The information playback apparatus 1 of the present embodiment is intended for use with a CD or a DVD. However, the present invention can be used with an MD having the similar basic principle as to information recording and information playback.

The information playback apparatus 1 of the present embodiment is classified as a music editing apparatus called an effector. However, the present invention is not limited to the effector, and naturally, can be applied to so-called CD player and DVD player as well.

The information playback apparatus 1 of the present embodiment plays back audio information, such as music. However, by allowing the information playback apparatus 1 to play back image information instead of audio information, it is possible to apply the information playback apparatus 1 to an image playback apparatus for playing back image information recorded in an information recording medium, such as a CD and a DVD.

In other words, when the user or the like registers a desired frame image among motion picture information recorded in a CD or a DVD, as a cue point, a plurality of frame images positioned prior to and subsequent to each other in reference to the registered frame image are stored in the cue point memory. Thus, when the cue point is specified later, image playback is performed based on the frame images in the cue point memory, which makes it possible to achieve quick random access in image playback. Further, by changing the timing of frame playback in response to a manipulation to rotate the jog dial 13, a desired frame image can be searched as soon as possible by changing a speed of the image playback or playing back images in the reverse direction.

Also, by storing the audio information in sync with the information of a frame image in the cue point memory, it is possible to perform random access of the audio information and image information simultaneously.

As has been described, the information playback apparatus of the present invention is provided with first storage means having a first memory region for storing information of a certain time duration corresponding to a past time, and a second memory region for storing information of a certain time duration corresponding to a future time with respect to information being subjected to information playback by information processing means. Hence, it is no longer necessary to play back new information from an information recording medium at each transition from forward playback to reverse playback or from reverse playback to forward playback, or transitions in shuttle playback, etc. Consequently, it is possible to achieve seamless playback quickly at the transition of playback.

Also, the information playback apparatus is provided with second storage means for performing so-called random access playback, and at a command to start random access playback, the random access playback is started based on the information stored in the second storage means, thereby making it possible to achieve quick random access playback.

Further, the second storage means is arranged to pre-store information of a certain time duration corresponding to a past time and information of a certain time duration corresponding to a future time with respect to the information being played back. Hence, there can be attained an excellent advantage that when manipulation means so-called a jog dial or the like is manipulated while so-called random access playback is specified, not only can quick random access be achieved, but also forward playback, reverse playback, or shuttle playback can be performed simultaneously based on the information of certain time durations corresponding to the past and future times stored in the second storage means.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information playback apparatus for playing back information recorded in an information recording medium, comprising:

readout device for reading out the information recorded in said information recording medium;

storage device for storing the information read out by said readout device; and information processing device for obtaining the information stored in said storage device and performing information playback processing, wherein said storage device has a first memory region for storing information of a certain time duration corresponding to a past time and a second memory region for storing information of a certain time duration corresponding to a future time, with respect to the information obtained by said information processing device, and said readout device reads out the information from said information recording medium to replenish said first memory region and said second memory region with the information.

2. The information playback apparatus according to claim 1, further comprising manipulation device manipulated in a forward direction and in a reverse direction, wherein said information processing device obtains the information corresponding to the future time from said second memory region when said manipulation device is manipulated in the forward direction, and obtains the information corresponding to the past time from said first memory region when said manipulation device is manipulated in the reverse direction.

3. The information playback apparatus according to claim 2, wherein said information processing device changes a processing speed of information playback processing for the information obtained from one of said first and second memory regions in response to a manipulation speed when said manipulation device is manipulated in one of the forward direction and the reverse direction.

4. An information playback apparatus, comprising:

control device for starting playback from arbitrary information recorded in an information recording medium;

readout device for reading out information recorded in said information recording medium;

first and second storage device for storing the information read out by said readout device;

information processing device for obtaining the information stored in one of said first and second storage device and performing information playback processing; and directing device for directing said control device to register said arbitrary information and to start playback from said registered arbitrary information, wherein said first storage device has a first memory region for storing information of a certain time duration corresponding to a past time and a second memory region for storing information of a certain time duration corresponding to a future time, all with respect to the information obtained by said information processing device, said second storage device has a first memory region for storing information of a certain time duration corresponding to a past time and a second memory region for storing information of a certain time duration corresponding to a future time, with respect to said arbitrary information, and wherein once directed by said directing device to register said arbitrary information, said control device controls said readout device to read out the information of the certain time duration corresponding to the past time and the information of the certain time duration corresponding to the future time, which are prior to and subsequent to each other in reference to said arbitrary information, from said information recording medium, and to store the two sorts of read-out information into said second storage device, and when directed by said directing device to start the playback from said arbitrary information, said control device controls said information processing device to perform the information playback processing based on the information stored in said second storage device.

5. The information playback apparatus according to claim 4, wherein when said information processing device is performing the information playback processing based on the information stored in said second storage device, said control device controls said readout device to read out information succeeding the information stored in said second storage device from said information recording medium and store the same into said first storage device, and when the storing of said succeeding information into said first storage device is completed, said control device controls said information processing device to perform a switchover for obtaining information from said first storage device.

6. The information playback apparatus according to claim 5, wherein said readout device reads out the information from said information recording medium to replenish said first memory region and said second memory region in said first storage device with the information.

7. The information playback apparatus according to claim 6, further comprising manipulation device manipulated in a forward direction and in a reverse direction, wherein said information processing device obtains the information corresponding to the future time from one of said second memory region in said first storage device and said second memory region in said second storage device when said manipulation device is manipulated in the forward direction, and obtains the information corresponding to the past time from one of said first memory region in said first storage device and said first memory region in said second storage device when said manipulation device is manipulated in the reverse direction.

8. The information playback apparatus according to claim 7, wherein said information processing device changes a processing speed of the information playback processing for the information obtained from said first or second memory regions in said first or second storage device, in response to a manipulation speed when said manipulation device is manipulated in the forward direction or the reverse direction.

* * * * *